(12) United States Patent
Williams et al.

(10) Patent No.: US 11,073,059 B2
(45) Date of Patent: Jul. 27, 2021

(54) METHOD AND SYSTEM FOR EXHAUST AIR INJECTION

(71) Applicant: Ford Global Technologies, LLC, Dearborn, MI (US)

(72) Inventors: Jason Williams, Dearborn Heights, MI (US); John M. Roth, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 16/548,707

(22) Filed: Aug. 22, 2019

(65) Prior Publication Data
US 2021/0054772 A1  Feb. 25, 2021

(51) Int. Cl.
   *F01N 3/22*  (2006.01)
(52) U.S. Cl.
   CPC .......... *F01N 3/225* (2013.01); *F01N 2270/10* (2013.01); *F01N 2560/06* (2013.01)
(58) Field of Classification Search
   CPC ... F01N 3/225; F01N 2270/10; F01N 2560/06
   USPC ........................................................ 60/289
   See application file for complete search history.

(56) References Cited

U.S. PATENT DOCUMENTS

| 3,943,709 | A  | * | 3/1976  | Holt ...................... F01N 13/009 60/274 |
| 4,394,351 | A  |   | 7/1983  | Gast |
| 8,820,056 | B2 | * | 9/2014  | VanDyne .................. F01N 3/10 60/295 |
| 9,109,494 | B2 |   | 8/2015  | Sharma et al. |
| 9,163,543 | B2 | * | 10/2015 | Cavataio ................. F01N 3/225 |
| 9,255,513 | B2 |   | 2/2016  | Surnilla et al. |
| 10,844,775 | B2 | * | 11/2020 | Kelly ...................... F01N 3/225 |
| 2004/0006972 | A1 |  | 1/2004  | Lewis et al. |
| 2014/0190150 | A1 | * | 7/2014  | Sakurai .................... F01N 3/085 60/286 |
| 2018/0128145 | A1 |   | 5/2018  | Uhrich et al. |
| 2019/0203629 | A1 | * | 7/2019  | Zink ....................... F01N 3/021 |
| 2019/0345857 | A1 | * | 11/2019 | Rollinger ................ F01N 3/025 |
| 2020/0116061 | A1 | * | 4/2020  | Hupfeld .................... F01N 3/30 |

FOREIGN PATENT DOCUMENTS

| DE | 102010007072 A1 | 8/2011 |
| EP | 2295755 A2 | 3/2011 |

* cited by examiner

*Primary Examiner* — Thai Ba Trieu
(74) *Attorney, Agent, or Firm* — Geoffrey Brumbaugh; McCoy Russell LLP (57) ABSTRACT

Methods and systems are provided for improving catalyst temperature control while reducing oxygen saturation. Secondary air is injected at a location downstream of the catalyst during selected conditions. A mixing valve position is coordinated with the air injection to improve local turbulence and thereby enhance air and fuel mixing in the exhaust passage, in at least one arrangement.

16 Claims, 5 Drawing Sheets

METHOD AND SYSTEM FOR EXHAUST AIR INJECTION

FIELD

The present description relates generally to methods and systems for injecting secondary air into an engine exhaust manifold, downstream of an exhaust catalyst.

BACKGROUND/SUMMARY

Engine out cold-start emissions generated before light-off of an exhaust system catalytic converter may contribute a large percentage of the total exhaust emissions. To expedite the attainment of the catalyst light-off temperature, systems have been developed that allow for the introduction of secondary air into an engine. These may include, for example, air pumps or thermactor systems, for example, port electric thermactor air systems (PETA), which are configured to inject secondary air into the exhaust manifold, upstream of the exhaust catalyst. Injection of air at the precatalytic location reacts with unburned fuel remaining in the exhaust. Additionally, or optionally, the injection of secondary air may be supplemented with additional fuel, such as with engine operation at a rich air-fuel ratio, to substantially increase the exhaust temperature and thereby decrease the light-off time.

One example of such as a system is provided by Lewis et al. in US 20040006972. Therein, during an engine cold start, exhaust manifold temperature is raised by operating the engine with a lean air-fuel ratio and retarded ignition timing until a threshold temperature is reached. Thereafter, the engine is operated with a rich air-fuel ratio and with secondary air introduced upstream of an exhaust catalyst via an air pump. After the emission control device reaches a target temperature, the engine is operated substantially around stoichiometry and introduction of secondary air is terminated.

However, the inventors herein have recognized potential issues with such systems. As one example, secondary air usage at the pre-catalyst location can result in oxygen saturation of the catalyst. Over-oxygenating the catalyst can result in increased NOx emissions. In addition, rich engine operation may be required to reactivate the catalyst, degrading fuel economy.

In one example, the issues described above may be addressed by a method comprising injecting air downstream of a catalyst without injecting air upstream of the catalyst in an exhaust passage in response to an exhaust temperature upstream of the catalyst being greater than a threshold and an exhaust temperature downstream of the catalyst being greater than the threshold. Because the downstream PETA can be injected downstream of all oxygen sensors, cold-start emissions can be reduced without over-oxygenating an exhaust catalyst. Post-catalyst PETA may be unmetered by any air-fuel ratio control system.

As one example, during cold-start conditions, a controller may compare an exhaust temperature upstream of an exhaust catalyst with the exhaust temperature downstream of the exhaust catalyst. At the onset of the cold-start, the controller may inject secondary air upstream of the catalyst via an air injection device, such as an air pump. Once the downstream temperature is sufficiently warm, such as above the threshold, at least a portion of the secondary air may be injected downstream of the catalyst while a remaining portion continues to be injected upstream of the catalyst. The addition of the downstream air injection results in additional oxidation of exhaust products resulting in lower emissions. The efficiency of the secondary air injection may be further enhanced by reducing the opening of an exhaust mixing valve positioned upstream of the catalyst. Reducing the opening of the mixing valve blocks the air flow of the secondary air injected upstream of the catalyst, increasing the location velocity and tumble of the exhaust gas in the vicinity of the catalyst. This improves the mixing of the exhaust gas with the secondary air, and thereby the magnitude of the secondary air reaction. In some examples, the exhaust manifold may also have a valve downstream of the catalyst, such a valve used for active exhaust noise tuning. During secondary air injection to the downstream location, the tuning valve may be moved to a more closed position to increase the effect of the downstream secondary air injection. Mixing valve position is determined by engine operating conditions. At some operating conditions, the sufficient mixing may occur with the valve open. At other conditions the valve will need to be positioned to achieve optimal mixing and reaction rates.

In this way, catalyst light-off may be expedited and cold-start emissions may be reduced. At the same time, oxygen saturation of an exhaust catalyst is averted. The technical effect of using a mixing valve to increase turbulence at the exhaust catalyst is that mixing of secondary air and exhaust gas is improved, allowing for improved performance of the secondary air upon passage through the exhaust catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
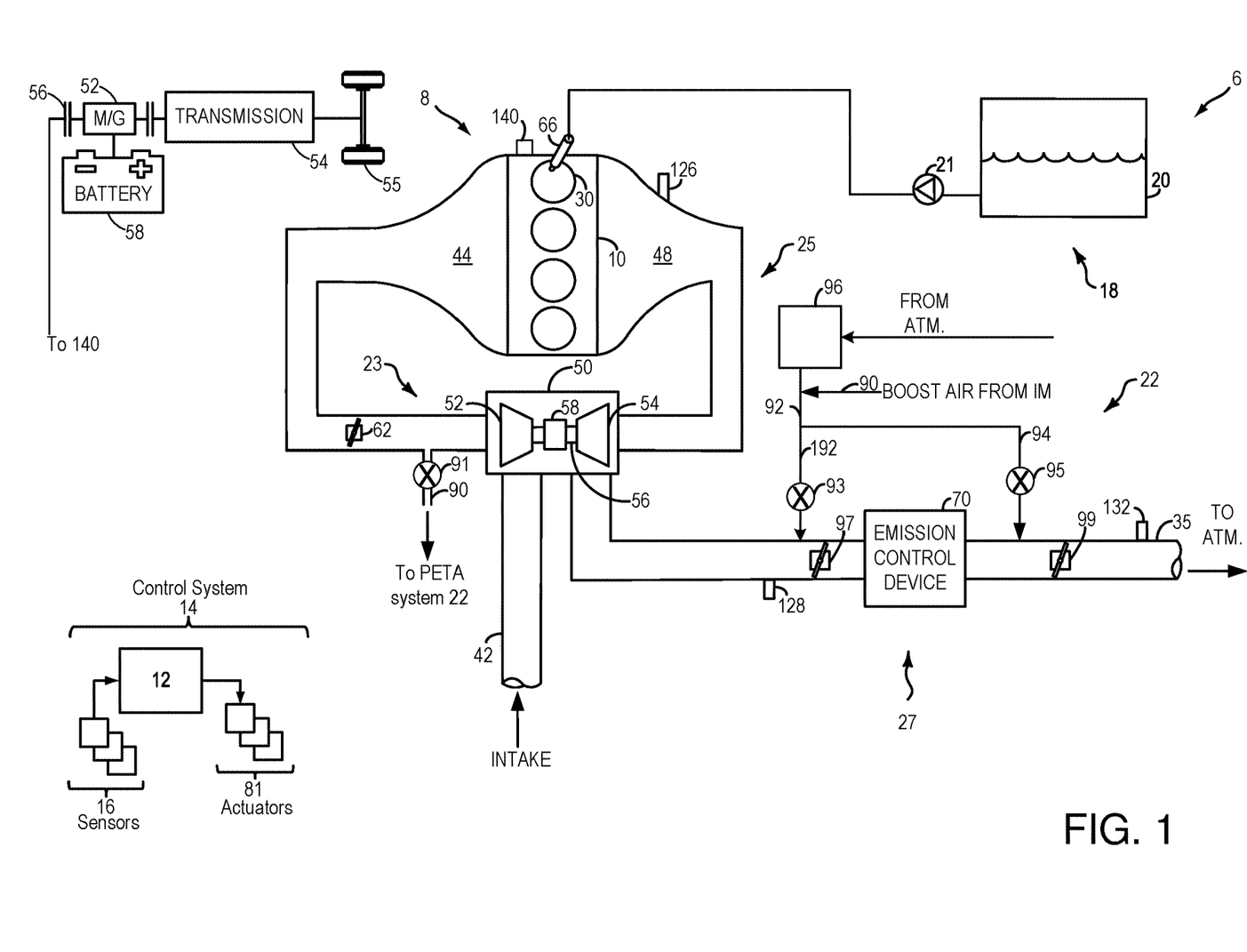
FIG. 1 shows a schematic depiction of a vehicle system including an engine and an associated secondary air injection system.
Figure 5:
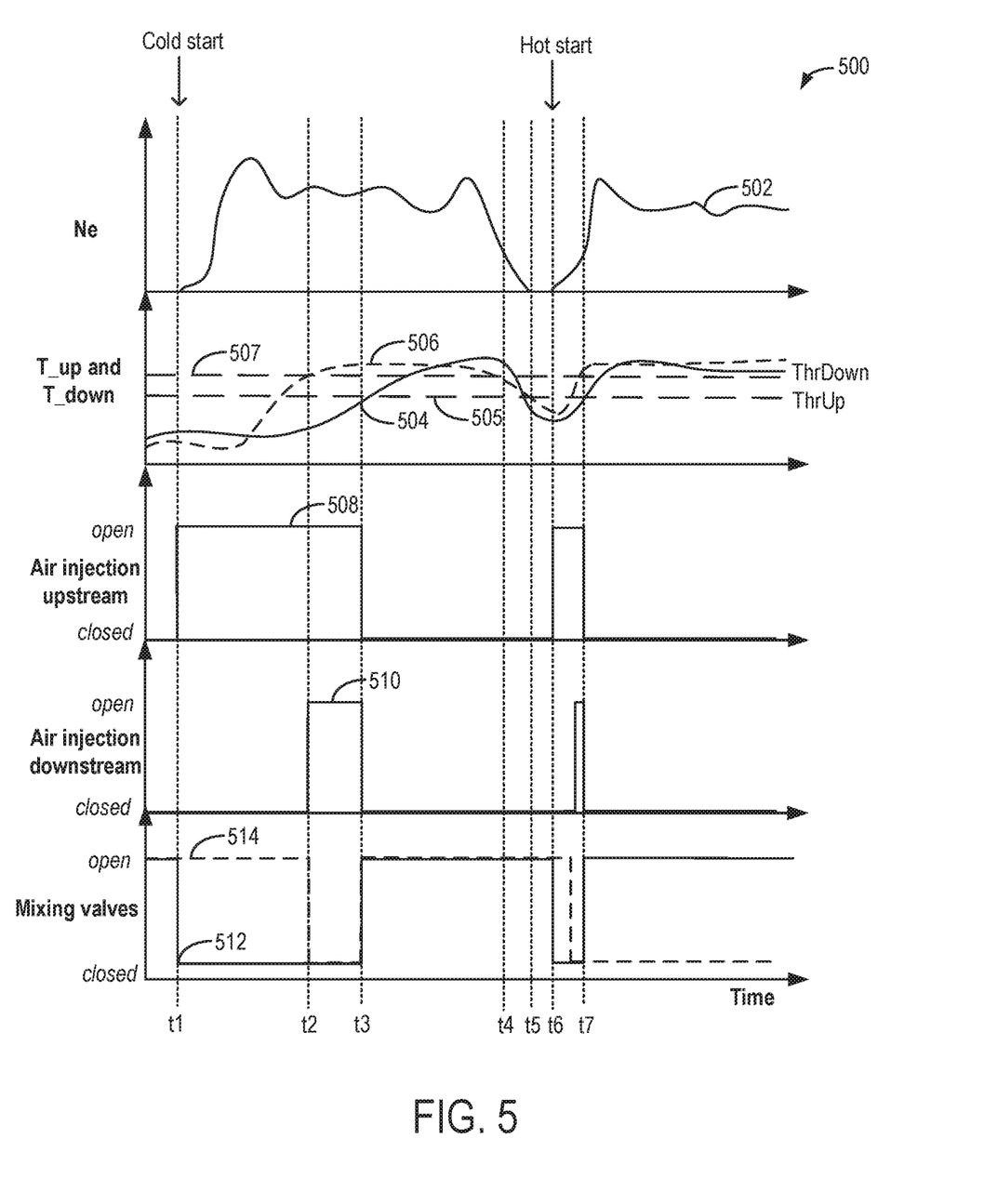
FIG. 5 shows a prophetic example of exhaust air injection for catalyst temperature control.

An air injection system may be provided in an exhaust system to enable catalyst temperature control, such as the system of FIG. 1. The system may be capable of injecting air upstream or downstream of an exhaust catalyst to combust unburned hydrocarbons and raise exhaust temperature. One or more mixing valves may also be coupled to the exhaust passage. A controller may be configured to perform a control routine, such as the example routine of FIG. 2, to adjust the position of the mixing valves while injecting air to a location upstream or downstream of the catalyst based on a temperature sensed downstream of the catalyst relative to upstream of the catalyst. The injection may also be adjusted as a function of engine conditions of an engine hot start, as shown at FIG. 3, or during a catalyst heating maneuver. A prophetic example of secondary air injection into an exhaust passage is shown at FIG. 5.

FIG. 1 shows a schematic depiction of a vehicle system 6. The vehicle system 6 includes an engine system 8 coupled to an exhaust after-treatment system 27. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger. Turbocharger 50 may include a compressor 52, arranged between intake passage 42 and intake manifold 44. Compressor 52 may be at least partially powered by exhaust turbine 54, arranged between exhaust manifold 48 and exhaust passage 35. Compressor 52 may be coupled to exhaust turbine 54 via shaft 56. Compressor 52 may also be at least partially powered by an electric motor 58. In the depicted example, electric motor 58 is shown coupled to shaft 56. However, other suitable configurations of the electric motor may also be possible. In one example, the electric motor 58 may be operated with stored electrical energy from a system battery (not shown) when the battery state of charge is above a charge threshold. By using electric motor 58 to operate turbocharger 50, for example at engine start, an electric boost (e-boost) may be provided to the intake air charge. In this way, the electric motor may provide a motor-assist to operate the boosting device. As such, once the engine has run for a sufficient amount of time (for example, a threshold time), the exhaust gas generated in the exhaust manifold may start to drive exhaust turbine 54. Consequently, the motor-assist of the electric motor may be decreased. That is, during turbocharger operation, the motor-assist provided by the electric motor 58 may be adjusted responsive to the operation of the exhaust turbine.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system.

While not shown in FIG. 1, each cylinder 30 may include one or more intake valves and one or more exhaust valves to control intake of charge air and release of exhaust gas, respectively. The timing of the opening and closing of the intake and exhaust valves may be fixed, or the intake and exhaust valve opening and/or closing timings may vary, such as to provide positive or negative valve overlap, late intake valve closing, or various other examples.

Engine exhaust 25 may be coupled to exhaust after-treatment system 27 along exhaust passage 35. Exhaust after-treatment system 27 may include one or more emission control devices, such as emission control device 70 which may be mounted in a close-coupled position in the exhaust passage 35. The emission control device may include a three-way catalyst, lean NOx conversion device, or particulate filter, SCR catalyst, and/or combinations thereof. In one example embodiment, emission control device 70 is a three-way catalyst.

The catalysts may enable toxic combustion by-products generated in the exhaust, such as NOx species, unburned hydrocarbons, carbon monoxide, etc., to be catalytically converted to less-toxic products before expulsion to the atmosphere. However, the catalytic efficiency of the catalyst may be largely affected by the temperature and oxygen content of the exhaust gas. For example, during an engine cold-start, when the catalyst temperature is below an activation temperature (e.g., below a light-off temperature), cold-start exhaust emissions may become elevated, thus requiring the catalyst to be heated. As another example, the reduction of NOx species at the catalyst may utilize higher temperatures than the oxidation of carbon monoxide. Unwanted side reactions may also occur at lower temperatures, such as the production of ammonia and $N_2O$ species, which may adversely affect the efficiency of exhaust treatment, and degrade the quality of exhaust emissions. To improve the efficiency of exhaust after-treatment, it may be required to maintain an exhaust temperature at the catalyst, for example, a specific temperature gradient upstream and downstream of the catalyst.

Figure 2:
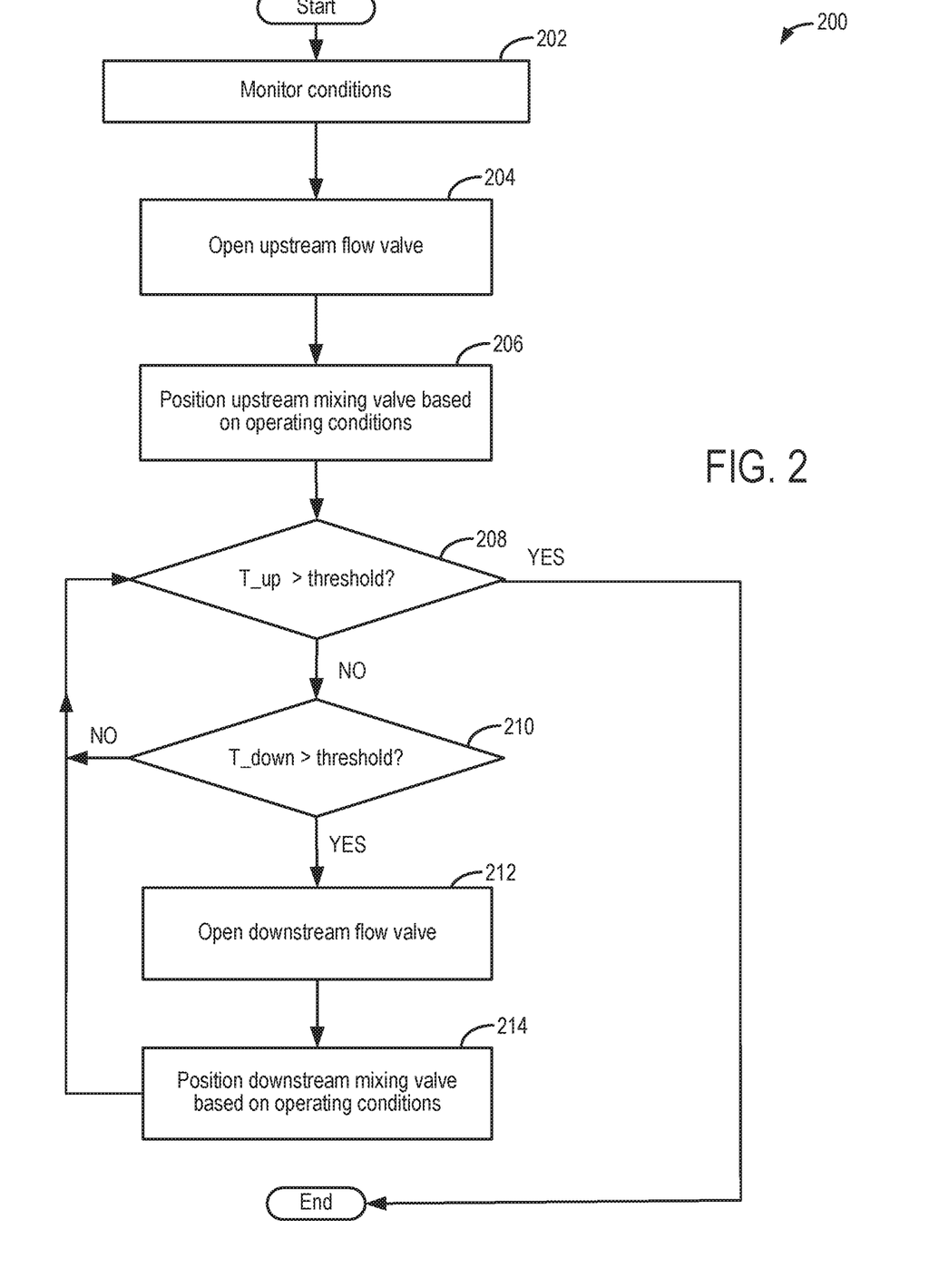
FIG. 2 shows a flow chart illustrating a method for injecting air in an exhaust passage, according to the present disclosure in a cold start scenario.
Figure 3:
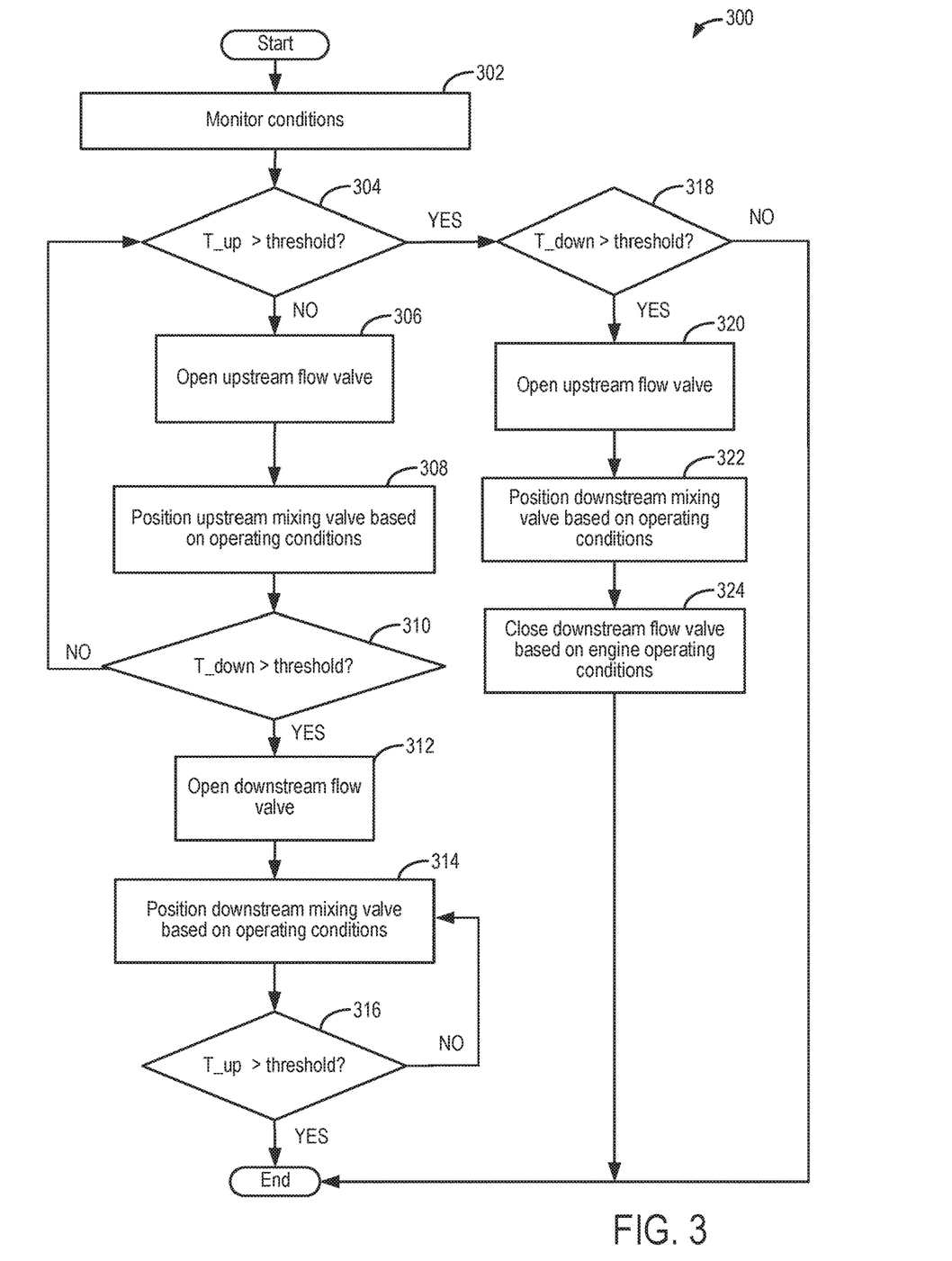
FIG. 3 shows a flow chart illustrating another method for injecting air in an exhaust passage during an engine hot start.
Figure 4:
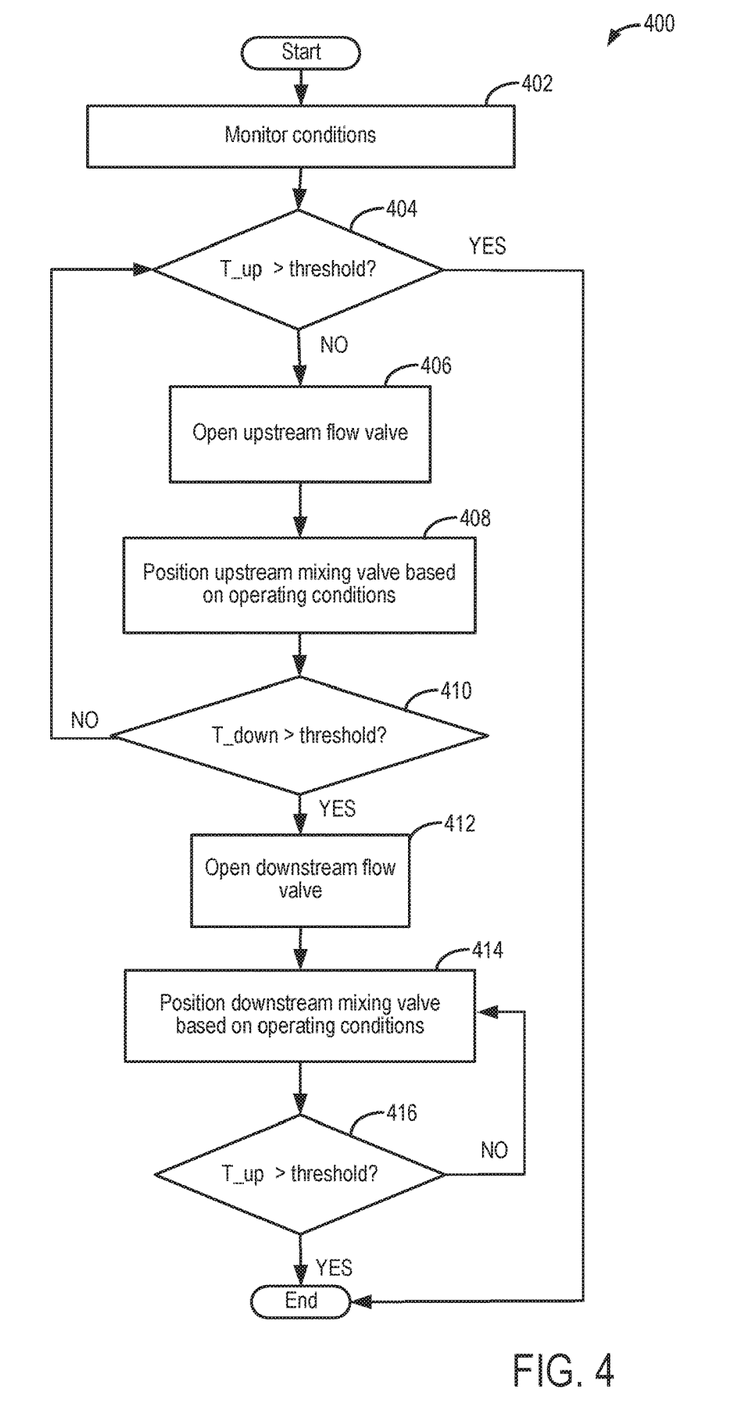
FIG. 4 shows a flow hart illustrating a method for injecting air in an exhaust passage during a catalyst heating maneuver.

As further elaborated herein with reference to FIGS. 2-4, an engine controller may be configured to inject secondary air flow into the exhaust after-treatment system upstream and/or downstream of emission control device 70 to raise exhaust temperature (and thereby catalyst temperature) to increase conversion of certain emissions during various operating conditions.

As depicted in FIG. 1, the secondary air may derive from one or more of multiple sources of a secondary air injection system 22 (herein also referred to a PETA system 22). For example, the secondary air may include compressed intake air that is directed to the exhaust passage from the intake passage between the compressor 52 and the throttle 62. Injection line 90 directs compressed intake air directly into secondary air injection passage 92 from where the air may be delivered to the exhaust passage 35, upstream and/or downstream of emission control device 70, via injection branches 192 and 94. The compressed intake air injected into the PETA system 22 via the injection line 90 may be controlled via valve 91, which may be controlled by the engine controller.

As another example, a dedicated secondary air pump 96 (such as an electric motor driven pump) may be present to inject outside air (e.g., from the atmosphere) into the exhaust passage 35 via secondary air injection passage 92.

The secondary air, from the compressor or the air pump, may be delivered to a location upstream of catalyst 70 via upstream injection branch 192, and flow through upstream injection branch 192 is controlled by injection valve 93. Likewise, the secondary air, from the compressor or the air pump, may be delivered to a location downstream of catalyst 70 via downstream injection branch 94, and flow through downstream injection branch 94 is controlled by injection valve 95.

Mixing of the secondary air, received upstream of catalyst 70, with exhaust gases and any unburned fuel therein, may be enhanced via adjustments to an upstream mixing valve 97. In particular, the secondary air injection is received upstream of catalyst 70 and upstream of mixing valve 97. The mixing valve may be configured as a throttle valve. Movement of the valve to a more closed position (e.g., a fully closed position) allows for an increase in local turbulence, improving air mixing. Thus, during conditions when air is injected at the upstream location, mixing valve 97 may be closed to enhance the thermogenic effect of the secondary air injection. During other conditions, such as when increased exhaust flow Mixing of the secondary air, received downstream of catalyst 70, with exhaust gases and any unburned fuel therein, may be enhanced via adjustments to a downstream mixing valve 99. In particular, the secondary air injection is received downstream of catalyst 70 and upstream of mixing valve 99. The mixing valve may be configured as a throttle valve. Movement of the valve to a more closed position (e.g., a fully closed position) allows for an increase in local turbulence, improving air mixing. Thus, during conditions when air is injected at the downstream location, mixing valve 99 may be closed to enhance the thermogenic effect of the secondary air injection. In one example, mixing valve 99 is an exhaust tuning valve used when secondary air injection is not being performed to adjust the quality of exhaust noise emanating from the engine. Then, when air injection is performed, the tuning valve is used to generate local turbulence for improved mixing.

A controller may vary the ratio of air delivered upstream relative to downstream of the catalyst based on various engine operating conditions, such as based on an exhaust temperature estimated upstream of the catalyst, via temperature sensor 128, relative to exhaust temperature estimated downstream of the catalyst, via temperature sensor 132. In one example, the adjusting is based on a temperature difference between the upstream estimated temperature and the downstream estimated temperature. In another example, the adjusting is based on a temperature ratio between the upstream estimated temperature and the downstream estimated temperature. In still another example, the adjusting is based on the upstream and the downstream estimated temperatures relative to a threshold (e.g., a common threshold or distinct thresholds). Further, a degree of opening of the upstream mixing valve 97 relative to downstream mixing valve 99 may also be adjusted as a function of the exhaust temperature.

As an example, when each of the upstream estimated temperature and the downstream estimated temperature are lower than a threshold, such as a time of an engine cold-start, the controller may open injection valve 93 allowing flow through the upstream injection branch 192. This will facilitate a reaction upstream of the catalyst, enhancing the rate at which its temperature rises. Once the upstream estimated temperature reaches a threshold, injection valve 93 is closed to avoid saturating the catalyst with oxygen. The downstream injection valve 95 would remain closed until a downstream temperature threshold was reached, at which time the valve would open. This provides a secondary reaction with the exhaust stream, consuming hydrocarbons and CO, reducing emissions levels. For this example both mixing valves in the open position if operating conditions are such that sufficient mixing occurs to facilitate the reactions.

As another example, when the upstream estimated temperature is lower than a threshold catalyst light-off temperature but the downstream estimated temperature is higher than a threshold temperature above which a reaction occurs reducing emissions levels, such as an extended idle period, the controller may open both the pre and post catalyst injection valves 93 and 95 in order to raise catalyst temperature and reduce post catalyst emissions. The mixing valves are thus positioned for optimal mixing based on the engine operating conditions.

As still another example, when each of the upstream estimated temperature and the downstream estimated temperature are higher than the threshold, such as a time of an engine hot-start, the controller may close the upstream injection valve 93 because the catalyst is active, but open the downstream injection valve to consume the exhaust products to lower tailpipe emissions. Again, the downstream mixing valve position would be determined by engine operating conditions for optimal mixing.

Exhaust after-treatment system 27 may also include hydrocarbon retaining devices, particulate matter retaining devices, and other suitable exhaust after-treatment devices (not shown). It will be appreciated that other components may be included in the engine such as a variety of valves and sensors.

In some examples, vehicle system 6 is a hybrid vehicle with multiple sources of torque available to one or more vehicle wheels 55. In other examples, vehicle system 6 is a conventional vehicle with only an engine, or an electric vehicle with only electric machine(s). In the example shown, vehicle system 6 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), upstream temperature sensor 128, and downstream temperature sensor 130. Other sensors such as pressure, temperature, air/fuel ratio, and composition sensors may be coupled to various locations in the vehicle system 6, as discussed in more detail herein. As another example, the actuators may include fuel injectors (such as fuel injector 66), a variety of valves, such as valves 91, 93, 95, pump 96, throttle 62, and mixing valves 97 and 99. The control system 14 may include a controller 12. The controller may receive input data from the various sensors, process the input data, and trigger the actuators in response to the processed input data, based on instruction or code programmed therein, corresponding to one or more routines. Example control routines are described herein with reference to FIGS. 2-4.

FIG. 2 is a flow chart illustrating a method 200 for controlling exhaust temperature for catalyst control. Method 200 may be carried out by an engine controller, such as controller 12, in response to signals from one or more sensors and according to instructions stored in the memory of the controller. As used herein "upstream" and "downstream" are relative to the direction of exhaust flow from the engine and to the atmosphere, e.g., the upstream emission control device is closer to the engine and receives engine-out exhaust prior to the exhaust reaching the downstream emission control device. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 200, a cold start comprises, at step 202, determining engine operating parameters. The engine operating parameters may include engine speed, engine load, fuel injection amount and timing, boost pressure, exhaust temperature, throttle position, mixing valve position, etc. The controller may determine the air-fuel ratio of exhaust in multiple locations, such as engine-out air-fuel ratio, air-fuel ratio at the inlet of the emission control device, air-fuel ratio at the outlet of the emission control device. The controller may also determine the exhaust temperature in multiple locations, such as upstream of the emission control device, and downstream of the emission control device.

At step 204, method 200 includes opening the upstream flow valve (e.g., injection valve 93). In all method 200 cold start scenarios, upstream PETA flow is desired to light-off the catalytic converter. Thus, in at least one example, valve 91 may be at least partially open for all method 200 cold start scenarios.

At step 206, the upstream mixing valve (e.g., upstream mixing valve 97) should be positioned based on engine operating conditions. In at least one example, the engine's control system (e.g., control system 14) may include a controller (e.g., controller 12) programmed to consider one or more engine operating conditions, including but not limited to, engine speed, pedal position, throttle position, desired or actual torque, and engine airflow.

By reducing the opening of the valves at locations downstream of the corresponding air injection sites, local turbulence is created which improves mixing of the injected air with exhaust gas already present in the exhaust passage. In at least one operating condition, a mixing valve may not be beneficial and will not be used in such conditions. Information from these conditions is obtained from by a powertrain control module at step 202 of method 200.

At step 208 of method 200, the upstream exhaust temperature is compared against an exhaust temperature threshold. In at least one example, the exhaust temperature threshold may be a predetermined threshold based on a catalyst light-off temperature. Additionally or alternatively, the exhaust temperature threshold may be a predetermined threshold based on engine warm-up conditions. For example, the exhaust temperature threshold may be a predetermined threshold at which the engine (including the engine oil, for example) is considered to be warmed up.

When the upstream exhaust temperature exceeds the threshold at step 208, the catalyst will be assumed to be up to desired temperature. A hot catalyst will catalyze most HC and CO emissions with great efficiency.

In the event that the conditions for step 208 are not met, method 200 will proceed to step 210. Step 210 compares the downstream exhaust temperature to a threshold (also referred to herein as a second threshold). In at least one example, the second threshold may be a predetermined temperature based on a catalytic light-off temperature. For example, the second threshold may be a predetermined temperature at which the downstream exhaust temperature is hot enough to expedite heating of the catalyst to the catalytic light-off temperature. Additionally or alternatively, the second threshold may be based upon a comparison of a current catalyst temperature to the downstream exhaust temperature. For example, if the downstream exhaust temperature is greater than a current catalyst temperature, wherein the current catalyst temperature is the second threshold, then the downstream exhaust is determined to be greater than the second threshold.

In examples where the current catalyst temperature the downstream exhaust temperature is greater than the second threshold, the current catalyst temperature may be based on a look-up table stored in non-transitory memory that takes into account engine operating conditions such as one or more of engine operating time, engine temperature, upstream exhaust temperature, downstream exhaust temperature, coolant temperature, and oil temperature, among others to estimate the current catalyst temperature. Additionally or alternatively, the current catalyst temperature may be based on a temperature sensor proximal the catalyst.

In the event that the downstream exhaust temperature is greater than a threshold (the second threshold) at step 210, then there is sufficient heat exiting the catalyst. Thus, method 200 moves to step 212 to utilize downstream PETA. This occurs by opening the downstream flow valve (e.g., injection valve 95) at step 212, and then considering operating conditions at 214, in a manner similar to, but distinct from, step 206. When there is sufficiently-hot exhaust leaving the catalytic converter, this downstream PETA helps react a portion of the CO and HC emissions that flowed through the catalytic converter without being catalytically converted.

Following step 214, method 200 proceeds once again to step 208, and steps 208 to 214 of method 200 are thus repeated until the upstream exhaust temperature is greater than the threshold at step 208.

Turning now to FIG. 3, an example method 300 is shown for adjusting secondary air injection during a hot engine start. It is noted that a hot engine start refers to a hot engine restart in which the catalyst may still be warm but not hot enough for immediate high efficiency.

At step 302 of method 300, the method includes monitoring engine conditions and confirming an engine hot-start. In particular, the engine hot-start condition may be confirmed by calculating a duration of time since an immediately previous engine shutdown. The engine hot-start may be confirmed if the engine is restarted after a threshold duration since an immediately previous shutdown. During that time, the temperature of the exhaust catalyst may have dropped below a threshold, such as below a light-off temperature (or an alternate activation temperature).

In at least one example, the engine hot-start may be confirmed if the duration since the immediately previous shutdown is greater than a first threshold duration and less than a second threshold duration. The first duration may be an amount of time at which it is the exhaust catalyst is predicted to have decreased below a threshold temperature (e.g., a light-off temperature or alternate activation temperature.) The second duration may be an amount of time at which the engine is determined to have transitioned into a cold start state. For example, the engine may be determined to have transitioned into the cold start state based on an amount of time at which the coolant temperature and/or engine oil temperature are determined to have decreased to below predetermined cold-start threshold temperatures.

At step 304, the method includes determining if an upstream catalyst temperature is greater than a threshold. In at least one example, the catalyst temperature is determined based on an upstream exhaust temperature.

If the upstream catalyst temperature is determined to be less than a threshold (e.g., based on upstream exhaust temperature), then method 300 moves to step 306, and the upstream flow valve (e.g., injection valve 93) is opened to provide a reaction with unburned exhaust products to increase catalyst temperature. At 308, the mixing valve (e.g., upstream mixing valve 97) is adjusted to the appropriate position to enhance mixing and thus reaction based on operating conditions.

Next, at 310, downstream exhaust temperature is compared to a threshold, also referred to herein as a second threshold. If the temperature is less than the second threshold, wherein the second threshold is a temperature at which a reaction can be achieved, then method 300 moves back to step 304.

If the downstream temperature is greater than the second threshold, then method 300 moves to step 312, and the downstream flow valve (e.g., injection valve 95) is opened and the mixing valve (e.g., downstream mixing valve 99) is positioned at step 314 to provide optimal turbulence. In this manner, residual combustible products are consumed, reducing emissions.

Continuing, at step 316, the upstream catalyst temperature is again compared to the threshold. If the threshold is reached all flow is stopped. For example, the flow may be stopped by adjusting valve 91 to a closed position. Additionally or alternatively, injection valve 93 and injection valve 95 may also be held at closed positions. If catalyst temperature is lower than the threshold, then method 300 moves to step 314, the flow conditions are maintained, and the mixing valves (e.g., upstream mixing valve 97 and/or downstream mixing valve 99) are adjusted based on operating conditions.

Returning to step 304, if the upstream catalyst temperature (based on upstream exhaust temperature) is greater than the threshold, then the downstream exhaust temperature is compared to a threshold at 318. This branch of logic is for the condition where the catalyst is active, but downstream flow may be desirable to consume residual exhaust products. As an example, this would be desirable to reduce emissions components that resulted from slippage through the catalyst during the warm start resulting from a lack of air/fuel control prior to closed loop control. If the downstream temperature is lower than the threshold, the method exits as the catalyst is sufficiently active and downstream flow will result in no reaction due to insufficient energy. If the downstream temperature is greater than the threshold, the downstream valve is opened at 320 and the mixing valve is appropriately positioned at 322. Downstream flow is then stopped based on operating conditions at step 324. For example, the downstream flow may be stopped in a similar manner as following a YES determination at step 316.

Moving to FIG. 4, method 400, an example catalyst heating scenario, is shown.

At step 402 of method 400, engine conditions and inputs are monitored, in a similar manner as method 202, for example.

At step 404, the exhaust temperature upstream of the catalytic converter is compared against a threshold. In the event that the temperature exceeds the threshold, the objective of lighting-off the catalyst has been achieved and the routine is concluded.

If the catalyst is not yet up to the threshold temperature, steps 406 and 408 are employed to flow PETA and utilize the mixing valve when it is beneficial. In particular, at step 406 an upstream flow valve (e.g., injection valve 93) is opened, and at step 408 an upstream mixing valve (e.g., upstream mixing valve 97) is positioned based on engine operating conditions.

At step 410, when the downstream temperature surpasses a threshold, also referred to herein as a second threshold, steps 412 and 414 are utilized to flow downstream PETA. In particular, downstream flow valve (e.g., injection valve 95) is opened at step 412, and downstream mixing valve (e.g., downstream mixing valve 99) is opened at step 414. Since the catalytic converter is not yet fully lit-off, this downstream PETA is used to advantageously consume some of the unburned CO and HC.

At step 416, the upstream exhaust temperature is compared to a target threshold. The target threshold may be a predetermined temperature based on a catalytic light-off temperature, in at least one example. When the upstream exhaust temperature is greater than the target threshold, the catalyst is considered to be heated and this example method 400 is concluded.

Turning now to FIG. 5, a prophetic example map 500 of secondary air injection is shown. In at least one example, the prophetic example shown at FIG. 5 may be carried out via a vehicle system, such as vehicle system 6 shown at FIG. 1. Map 500 depicts engine speed (Ne) at plot 502. Changes in engine speed may be indicative and reflective of changes in operator torque demand. Exhaust temperature sensed upstream of an exhaust catalyst is shown at plot 504 (solid line) and exhaust temperature sensed downstream of the exhaust catalyst is shown at plot 506 (dashed line). Both temperatures are compared to unique thresholds (ThrUp 505 and ThrDown 507).

Though the ThrUp 505 and ThrDown 507 are unique thresholds, it is noted that ThrUp 505 and ThrDown may both be based at least in part on catalyst temperature. For example, the ThrUp 505 may be based on an exhaust temperature upstream of the catalyst at which the catalyst is estimated to achieve light-off temperature. As another example, the ThrDown 507 may be based on an exhaust temperature downstream of the catalyst at which catalyst conversion efficiency may be considered degraded. Alternatively, ThrDown 507 may be based on a downstream exhaust temperature at which reactions may be carried out with injected air. For example, the ThrDown 507 may be based on a temperature that successfully facilitates a combustion reaction for exhaust products downstream of the catalyst. Thus, although the ThrDown 507 is shown as being a higher temperature than the ThrUp 505 temperature, in at least one example the ThrDown 507 may be a lower temperature than the ThrUp 505 temperature depending on a combustion temperature for exhaust products downstream of the catalyst. It is noted that in the example shown at map 500, the ThrUp 505 threshold for exhaust temperature sensed upstream of the exhaust catalyst is lower than the ThrDown 507 threshold for exhaust temperature sensed downstream of the exhaust catalyst.

Secondary air injection at a location upstream of the catalyst is shown at 508 (e.g., via injection valve 93) while secondary air injection at a location downstream of the catalyst (e.g., via injection valve 95) is shown at 510. A ratio of air injected at the upstream location relative to the downstream location can be inferred by comparing plots 508 and 510 to each other. It is noted that in an open position, PETA air is allowed to flow upstream and downstream of the exhaust catalyst, respectively. A position of upstream mixing valve is shown at plot 512 while a position of the downstream mixing valve is shown at plot 514. It is noted that the closed positions of the upstream air injection 508 and the downstream air injection 510 prevent PETA air flow injection upstream and downstream of the exhaust catalyst, respectively. It is further noted that the positions shown for the upstream mixing valve 512 (e.g., upstream mixing valve 97) and downstream mixing valve 514 (e.g., downstream mixing valve 99) are between a fully open position and a reduced opening position. However, the upstream mixing valve 512 and the downstream mixing valve 514 are not fully closed in map 500. All plots are shown over time along the x-axis.

The upstream exhaust temperature 504 is initially below the ThrUp 507 at t1. As such, upstream PETA is flowed to increase the exhaust temperature into the catalyst, as shown at 508. In particular, injection valve 93 may be opened so that upstream PETA air is flowed.

The initial downstream temperature at t1 is below the downstream threshold ThrDown 505. In this instance, PETA is not flowed downstream because the temperature is too low for a reaction. Thus, as seen at 510, air injection downstream is closed. Thus, injection valve 95 may be closed.

Additionally, the upstream mixing valve 512 (e.g., upstream mixing valve 97) is held in a reduced opening position to create local turbulence upstream of the exhaust catalyst. That is, the upstream mixing valve 512 is adjusted towards a closed position. In this way, the technical effect of improved mixing and thus improved conversion at the catalyst may be achieved. As to downstream mixing valve 514 (e.g., downstream mixing valve 99), downstream mixing valve 514 is maintained in an open position.

At t2, downstream exhaust temperature 506 exceeds ThrDown 507. As such, air injection downstream is initiated responsive to the downstream exhaust temperature 506 exceeding ThrDown 507. In at least one example, air injection downstream may be initiated by opening a valve such as injection valve 95. Additionally, downstream mixing valve 514 is moved towards a closed position.

At t2, there is sufficient enthalpy downstream of the in the exhaust flow, while the upstream exhaust temperature 504 is still below ThrUp 505, thus PETA air injection upstream and downstream is carried out. That is, at t2, the downstream exhaust temperature 506 is greater than the downstream exhaust temperature threshold ThrDown 507 at the same time that the upstream exhaust temperature 504 is below the upstream exhaust temperature threshold ThrUp 505. Thus, both upstream air injection 508 and downstream air injection 510 are carried out. Due to the conditions above, both upstream air injection 508 and downstream air injection 510 are carried out from t2 to t3. Further, both the upstream mixing valve 512 and the downstream mixing valve 514 are maintained at reduced opening positions from t2 to t3.

At t3, upstream exhaust temperature 504 exceeds the upstream exhaust temperature threshold ThrUp 505. Thus, responsive to the upstream exhaust temperature 504 exceeding upstream exhaust temperature threshold ThrUp 505, upstream air injection and downstream air injection (PETA flow) is stopped. Moreover, the upstream mixing valve 512 (e.g., upstream mixing valve 97) and the downstream mixing valve 514 may both be moved to fully open positions so that air is allowed to pass freely through, as localized turbulence is no longer necessary.

At t4, the engine is commanded off and the engine stops combusting at t4. The engine further spins down to stopping between t4 and t5. The upstream exhaust temperature 504 and the downstream exhaust temperature 506 begins decreasing after the engine is commanded off at t4, and the upstream exhaust temperature 504 and the downstream exhaust temperature 506 decrease below their respective threshold ThrUp 505 and ThrDown 507 between t4 and t6. Additionally, valves for the upstream air injection 508 and the downstream air injection 510 are maintained in a closed position from t4 to t6. The mixing valve 512 is maintained in an open position from t4 to t6.

At t6, an engine start is commanded. The engine start at t6 is a hot engine start as discussed above with reference to FIG. 3. The engine start at t6 is a hot engine start as, due to the duration since the immediately previous engine shutdown, the catalyst is still warm but not hot enough for immediate high efficiency. For example, due to the duration since the immediately previous engine shutdown, the catalyst may be below a catalyst light-off temperature but relatively warm compared to an engine cold start.

Responsive to the hot engine start at t6 and the upstream exhaust temperature 504 being less than the ThrUp 505, upstream air injection 508 is initiated at t6. As the downstream exhaust temperature 506 is less than ThrDown 507, downstream air injection 510 is not carried out. Additionally, upstream mixing valve 512 is adjusted to a reduced opening position at t6 in order to increase localized turbulence upstream of the catalyst. Downstream mixing valve 514 is maintained in a fully open position at t6. The upstream air injection 508 is continued from t6 to t7, and the upstream mixing valve 512 is maintained in the reduced opening position from t6 to t7. Additionally, the downstream air injection 510 is not carried out from t6 until just prior to t7. As seen in map 500, the downstream exhaust temperature 506 exceeds ThrDown 507 just prior to t7. Thus, the downstream air injection 510 is carried out just prior to t7. The downstream mixing valve 514 is also adjusted towards a closed position just prior to t7.

At t7, the upstream exhaust temperature 504 exceeds ThrUp 505 and the downstream exhaust temperature 506 exceeds ThrDown 507. As such, responsive to upstream exhaust temperature 504 exceeding ThrUp 505, upstream air injection 508 is deactivated. Additionally, upstream mixing valve 512 is fully opened at t7 responsive to the upstream exhaust temperature 504 exceeding the ThrUp 505. The downstream mixing valve 514 is maintained at a reduced opening state at t7. Further, the downstream air injection 510 deactivated at t7.

In this way, catalyst activation may be achieved faster and without causing undesired oxygen saturation. The technical effect of injecting air to a location downstream of an exhaust catalyst is that unburned fuel and CO escaping from the catalyst can be combusted to reduce emissions. By closing a mixing valve positioned between the catalyst and the air injection location, local turbulence can be increased to improve mixing of secondary air and unburned fuel for combustion at or near the exhaust catalyst. By expediting catalyst temperature control without oxygen saturating the catalyst, exhaust emissions are improved with a lower impact on fuel economy. In a further representation, the vehicle system is a hybrid vehicle or an autonomous vehicle.

Thus provided herein are systems and methods for expediting catalyst temperature control without oxygen saturating a catalyst. It is noted that any of the methods and examples by way of the prophetic map disclosed herein may be carried out in a vehicle system such as disclosed in relation to FIG. 1.

In a first approach according to the present disclosure, a method comprises injecting air downstream of a catalyst without injecting air upstream of the catalyst in an exhaust passage responsive to an exhaust temperature upstream of the catalyst being greater than a first threshold and an exhaust temperature downstream of the catalyst being greater than a second threshold. In a first example of the first approach, the method further comprises adjusting a position of a flow mixing valve towards a closed position when injecting air upstream of the catalyst. In a second example of the first approach which optionally includes the first example, the flow mixing valve is positioned upstream of the exhaust catalyst. In a third example of the first approach, which optionally includes one or both of the first and second examples, the method further comprises injecting air both upstream and downstream of a catalyst in response to the exhaust temperature upstream of the catalyst decreasing below the first threshold and the exhaust temperature downstream of the catalyst being greater than the second threshold. In a fourth example approach of the first approach, which optionally includes one or more of the first through third examples, the method further comprises adjusting a flow mixing valve positioned downstream of the catalyst towards a closed position when injecting air downstream of the catalyst. In a fifth example of the first approach, which optionally includes one or more of the first through fourth approaches, the injected air is port electric thermactor air (PETA). In a sixth example of the first approach, which optionally includes one or more of the first through fifth examples, the first threshold temperature is based on a catalyst light-off temperature, and wherein the second threshold temperature is based on a temperature for a combustion reaction of unburned exhaust products downstream of the catalyst.

In a second approach according to the present disclosure, which may include any one or more of the features discussed in relation to the first approach, a method comprises detecting an exhaust temperature upstream of a catalyst that is less than a first threshold; detecting an exhaust temperature downstream of the catalyst that is less than a second threshold; opening a first flow valve positioned upstream of the catalyst to introduce port electric thermactor air (PETA) into a passage upstream of the catalyst; and holding a second flow valve positioned downstream of the catalyst in a closed position to prevent introduction of PETA air into a passage downstream of the catalyst. In a first example of the second approach, the first threshold and the second threshold are different threshold temperatures. In a second example of the second approach, which optionally includes the first example, the first threshold is based on a catalyst light-off temperature. In a third example of the second approach, which optionally includes one or both of the first and second examples, the method further comprises adjusting an upstream mixing valve towards a closed position, wherein the upstream mixing valve is positioned immediately upstream of the catalyst. In a fourth example of the second approach, which optionally includes one or more of the first through third examples, the upstream mixing valve is a throttle valve. In a fifth example of the second approach, which optionally includes one or more of the first through fourth examples, an air-fuel ratio downstream of the second flow valve is unmetered.

In a third approach according to the present disclosure, which optionally includes one or more of the features disclosed in the first and second approaches, a method comprises, during a first condition, detecting an upstream exhaust temperature that is less than a first threshold, the upstream exhaust temperature being a temperature upstream of a catalyst; detecting a downstream exhaust temperature that is greater than a second threshold, the downstream exhaust temperature being a temperature downstream of the catalyst; injecting port electric thermactor air (PETA) both upstream and downstream of the catalyst; and adjusting a position of an upstream mixing valve towards a closed position, the upstream mixing valve positioned immediately upstream of the catalyst. In a first example of the third approach, the PETA injection downstream of the catalyst is further downstream of all exhaust oxygen sensors. In a second example of the third approach, which optionally includes the first example, the method further comprises during a second condition, detecting that the upstream exhaust temperature is greater than the first threshold; detecting that the downstream exhaust temperature is greater than the second threshold; injecting PETA downstream of the catalyst without PETA injection upstream of the catalyst; adjusting the upstream mixing valve to a fully open position; and adjusting a position of a downstream mixing valve towards a closed position, wherein the downstream mixing valve is positioned downstream of the catalyst. In a third example of the third approach, which optionally includes one or more of the first and second examples, the first condition is an engine cold start condition, and wherein the second condition is an engine hot start condition. In a fourth example of the third approach, which optionally includes one or more of the first through third examples, the first threshold and the second threshold are different threshold temperatures. In a fifth example of the third approach, which optionally includes one or more of the first through fourth examples, the first threshold temperature is based on a light-off temperature of the catalyst. In a sixth example of the third approach, which optionally includes one or more of the first through fifth examples, the second threshold temperature is based on a temperature for a combustion reaction of unburned exhaust products downstream of the catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine system including a controller, comprising:
injecting air downstream of a catalyst without injecting air upstream of the catalyst in an exhaust passage by operating a secondary air injection system of the engine system via the controller responsive to an exhaust temperature upstream of the catalyst being greater than a first threshold and an exhaust temperature downstream of the catalyst being greater than a second threshold, the exhaust temperature upstream of the catalyst detected via a first temperature sensor and the exhaust temperature downstream of the catalyst detected via a second temperature sensor.

2. The method of claim 1, further comprising adjusting a position of a flow mixing valve towards a closed position via the controller when injecting air upstream of the catalyst.

3. The method of claim 2, wherein the flow mixing valve is positioned upstream of the catalyst.

4. The method of claim 1, further comprising injecting air both upstream and downstream of the catalyst in response to the exhaust temperature upstream of the catalyst detected via the first temperature sensor decreasing below the first threshold and the exhaust temperature downstream of the catalyst being detected via the second temperature sensor greater than the second threshold.

5. The method of claim 4, further comprising adjusting a flow mixing valve positioned downstream of the catalyst towards a closed position via the controller when injecting air downstream of the catalyst.

6. The method of claim 1, wherein the secondary air injection system provides port electric thermactor air (PETA).

7. A method for operating an engine system including a controller, comprising:
detecting an exhaust temperature upstream of a catalyst that is less than a first threshold via a first temperature sensor;
detecting an exhaust temperature downstream of the catalyst that is less than a second threshold via a second temperature sensor;
opening a first flow valve positioned upstream of the catalyst via the controller to introduce port electric thermactor air (PETA) into a passage upstream of the catalyst; and
holding a second flow valve positioned downstream of the catalyst in a closed position via the controller to prevent introduction of PETA air into a passage downstream of the catalyst.

8. The method of claim 7, wherein the first threshold and the second threshold are different threshold temperatures stored in the controller.

9. The method of claim 7, further comprising adjusting an upstream mixing valve towards a closed position via the controller, wherein the upstream mixing valve is positioned immediately upstream of the catalyst.

10. The method of claim 9, wherein the upstream mixing valve is a throttle valve.

11. The method of claim 7, wherein an air-fuel ratio downstream of the second flow valve is unmetered.

12. A method for operating an engine system including a controller, comprising:
during a first condition,
detecting an upstream exhaust temperature that is less than a first threshold via a first temperature sensor, the upstream exhaust temperature being a temperature upstream of a catalyst;
detecting a downstream exhaust temperature that is greater than a second threshold via a second temperature sensor, the downstream exhaust temperature being a temperature downstream of the catalyst;
injecting port electric thermactor air (PETA) both upstream and downstream of the catalyst by operating a secondary air injection system of the engine system via the controller; and
adjusting a position of an upstream mixing valve towards a closed position via the controller, the upstream mixing valve positioned immediately upstream of the catalyst.

13. The method of claim 12, wherein the FETA injection is downstream of the catalyst and further downstream of all exhaust oxygen sensors.

14. The method of claim 12, further comprising,
during a second condition,
detecting that the upstream exhaust temperature is greater than the first threshold via the first temperature sensor;
detecting that the downstream exhaust temperature is greater than the second threshold via the second temperature sensor;
injecting PETA downstream of the catalyst without PETA injection upstream of the catalyst by operating the secondary air injection system of the engine system via the controller;
adjusting the upstream mixing valve to a fully open position via the controller; and
adjusting a position of a downstream mixing valve towards a closed position via the controller, wherein the downstream mixing valve is positioned downstream of the catalyst.

15. The method of claim 14, wherein the first condition is an engine cold start condition, and wherein the second condition is an engine hot start condition.

16. The method of claim 12, wherein the first threshold and the second threshold are different threshold temperatures.

* * * * *